United States Patent Office 2,755,270
Patented July 17, 1956

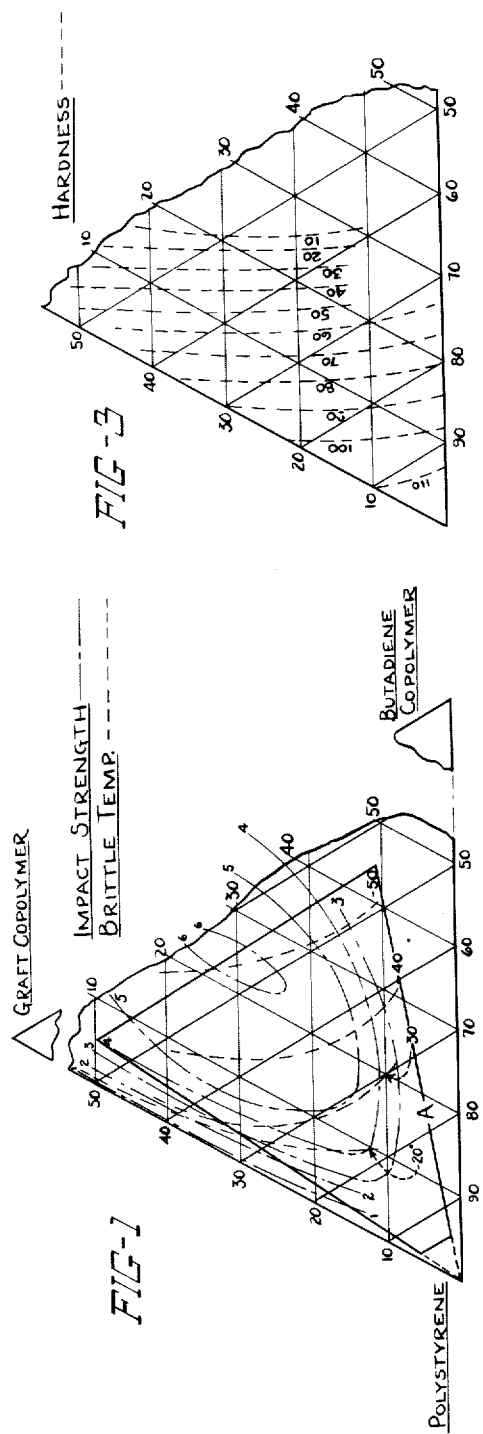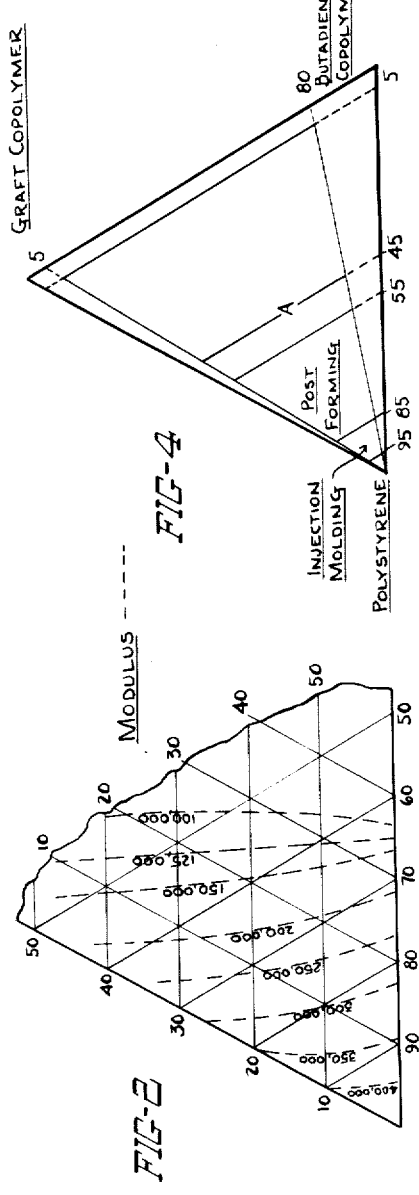

2,755,270

COMPOSITIONS OF STYRENE RESINS, BUTADIENE RUBBERS AND GRAFT COPOLYMERS OF STYRENES ON BUTADIENE RUBBERS

Robert A. Hayes, Akron, Ohio, assignor to The Firestone Tire & Rubber Company, Akron, Ohio, a corporation of Ohio Application October 21, 1952, Serial No. 315,987

16 Claims. (Cl. 260—45.5)

This invention relates to novel poly-component blends of high polymeric materials, and more particularly, to compositions comprising (A) a styrene-type resin, (B) a graft copolymer of styrene on a rubbery butadiene polymer or copolymer and (C) a rubbery butadiene polymer or copolymer. As used in this specification, and as defined in the Report on Nomenclature of the International Union of Pure and Applied Chemistry, Journal of High Polymer Science, vol. VIII, p. 260, the term "graft copolymer of styrene upon a butadiene polymer" signifies a polymeric product produced by subjecting styrene to polymerizing conditions in the presence of a previously formed butadiene polymer, as more fully described hereinbelow.

A number of proposals have been made to combine resinous polymers with rubbery polymers to yield materials which have novel properties not found in either of the individual components. For instance, compositions comprising vinyl chloride resin with rubbery butadiene-acrylonitrile copolymers, and compositions comprising styrene-acrylonitrile copolymers with rubbery butadiene-acrylonitrile copolymers have enjoyed some commercial success, these compositions being rather boardy, stiff materials which, in sheet form, may be hot post-formed into a variety of articles. However, these compositions all require the relatively expensive acrylonitrile as one starting material. Also unfortunately, these products do not have the combination of properties of high modulus coupled with good heat distortion characteristics, as well as high impact strength over a range of temperatures.

Accordingly, it is an object of this invention to provide novel poly-component polymeric compositions.

Another object is to provide such compositions based upon relatively inexpensive hydrocarbon starting materials, and specifically upon butadiene and styrene.

A further object is to provide such compositions which will make at least partial use of commercially available polymeric materials such as rubbery butadiene-styrene copolymers and polystyrene.

Still another object is to provide such compositions which will have improved and novel properties adapting them for novel uses, and which particularly will have high impact strength, high heat distortion point and a high modulus of elasticity.

Still another object is to produce such compositions having excellent low temperature impact strength without any substantial impairment of the other excellent properties noted in connection with the preceding objects.

A still further object is to provide novel compositions which, in sheet form, are adapted for hot post-forming into various structures.

A still further object is to provide novel molding compositions suitable for injection-molding and extrusion.

Still other objects will become apparent as the description proceeds.

The invention will be described in connection with the attached drawings, wherein—

Fig. 1 is a fragmentary trilinear chart of preferred compositions of this invention based on a particular set of three polymeric starting materials, on which chart are plotted the iso-lines for the impact strength and brittle temperatures of the compositions;

Fig. 2 is a fragmentary trilinear chart of the same system as Fig. 1, except that the iso-lines are those of Young's modulus;

Fig. 3 is a fragmentary chart of the same system as Fig. 1, except that the iso-lines are those of the Rockwell hardness of the compositions, and Fig. 4 is a small scale complete chart of which Figs. 1–3 are parts, showing the boundaries of the compositions of this invention.

SYNOPSIS OF THE INVENTION

The above and other objects are secured, in accordance with this invention, in compositions having the following components in the following proportions:

A. A styrene-type resin .......... 5 to 95%, based on the total weight of ingredients A, B, and C.
B. A graft copolymer of styrene on a rubbery butadiene polymer of copolymer ........ 20 to 95%  } Based on the combined weight of ingredients B and C, exclusive of ingredient A.
C. Rubbery butadiene polymer or copolymer ........ 5 to 80%

Ingredients A, B and C in turn should constitute at least 75% of the entire composition, the balance being made up of conventional fillers, pigments, reinforcing agents, plasticisers, stabilizers and the like. The resultant compositions form compatible mixtures, notwithstanding the known incompatibility of polystyrene with rubbery butadiene-styrene copolymers. The compositions have excellent impact strengths, heat distortion temperatures, moduli of elasticity and tensile strengths. Particularly those compositions containing 55 to 85% of polystyrene are useful in the form of relatively stiff, heavy sheets designed for post-forming into a wide variety of shaped structures. They also may be fabricated into various shapes by injection molding and extrusion. The post-forming sheets of the compositions of this invention have unusually excellent low temperature properties, especially when the butadiene polymer or copolymer (C) contains not more than 20% of styrene.

The compositions of this invention containing relatively higher proportions of polystyrene, say 85% to 95% based on the weight of the essential ingredients A, B and C, find particular application in injection molding. Compositions of this type combine the excellent strength and hardness of polystyrene with a high degree of resistance to impact loads.

THE GRAFT COPOLYMERS OF STYRENE UPON RUBBERY BUTADIENE POLYMERS AND COPOLYMERS

These are materials produced by adding monomeric styrene to an already completely or nearly completely free-radical polymerized latex of a rubbery polymer or copolymer of butadiene. Polymerization by free radical mechanisms is then continued. In the resultant product, the styrene appears to have combined with the already polymerized butadiene; at any rate, only small amounts of styrene polymer can be separated therefrom by physical methods. Such products are referred to in this specification as "graft copolymers" of styrene upon the butadiene polymer or copolymer. This type of product and process have also been termed "epipolymers" and "epipolymerization" and the terms "graft copolymer(ization)" and "epipolymer(ization)" may be used interchangeably. However, the terms "graft copolymer" and "graft copolymerization" appear to be gaining wider acceptance, and these terms will be used in this specification, with the understanding that they are synonymous respectively with "epipolymer" and "epipolymerization." Without absolute commitment to this theory, it is believed that centers along the chains of already-polymerized butadiene are reactivated, and serve to start new branching side chains of polymerized styrene attached to the old butadiene polymer chains.

With reference to the rubbery butadiene polymer or copolymer latex upon which the styrene is to be graft copolymerized, this may be a latex of (I) essentially a homopolymer of butadiene, or (II) essentially a copolymer of butadiene with (1) styrene, with (2) alpha-methyl styrene or with (3) a mixture of styrene and alpha-methyl styrene. The copolymers (II) should contain at least 60% of butadiene copolymerized therein. The percentages of monomers referred to herein are on the basis of the weights of the polymers, copolymers and graft copolymers containing them. The homopolymers and copolymers may contain, in addition to the butadiene and any styrene and/or alpha-methyl styrene, not over 10% of other ethylenically unsaturated compounds copolymerizable therewith, which copolymerizable compounds may be either mono-unsaturated or conjugated di-unsaturated. Very small proportions, say up to 3%, of non-conjugated cross-linking di-unsaturated compounds such as divinyl benzene, may also be present in the copolymers. It will be understood that the above percentages are on the basis of the weight of the copolymers. Suitable monomers for copolymerization with butadiene include, for instance, vinyl compounds such as vinyl acetate, vinyl formate, vinyl propionate, higher fatty vinyl esters such as vinyl stearate, vinyl chloride, vinyl fluoride and the like, vinyl aromatics such as the various mono- and poly-nuclearly chlorinated styrenes, vinyl naphthalene, vinyl carbazole and the like; vinyl ethers and ketones such as methyl vinyl ketone, ethyl vinyl ketone, methyl vinyl ether, ethyl vinyl ether, isopropyl vinyl ether and the like; vinylidene compounds such as vinylidene chloride, vinylidene chlorobromide, methyl isopropenyl ketone, isopropenyl acetate and the like; alpha, beta unsaturated acyl compounds such as acrylic acid, methacrylic acid, methyl acrylate, methyl methacrylate, ethyl acrylate, diethyl maleate, maleic anhydride, and the like; and conjugated unsaturated compounds such as isoprene, 2,3-dimethyl-1,3-butadiene, chloroprene, piperylene, 2,3-dichloro-1,3-butadiene and the like. For a more complete list of compounds known to copolymerize with butadiene, reference is made to Krczil "Kurzes Handbuch Der Polymerisations—Technik," Edwards Brothers, Inc., vol. 2, p. 655–656, the items indented under "Butadien."

The original polymerization of the latex upon which the styrene is to be graft copolymerized may be carried out in accordance with any usual or suitable procedure in this art. In general, the butadiene, together with any comonomers to be used, is emulsified in water with the aid of micelle-forming emulsifying agents which are usually compounds containing hydrocarbon groups of from 8 to 22 carbon atoms coupled to highly polar solubilizing groups such as alkali metal and ammonium carboxylate groups, sulfate half-ester groups, sulfonate groups, phosphate partial ester groups and the like. Exemplary emulsifying agents include sodium oleate, sodium stearate, the sodium salts of the sulfate half esters of fatty alcohols produced by reduction of the fatty acids of natural oils such as cocoanut oil, sodium abietate, sodium salts of sulfosuccinic esters such as sodium dioctyl sulfosuccinate, sodium salts of alkylated benzene and naphthalene sulfonic acids such as sodium didodecyl naphthalene sulfonate, sodium salts of monosulfated fatty monoglycerides and the like. The polymerization medium will contain a suitable water-soluble free-radical-generating catalyst such as hydrogen peroxide, potassium or sodium persulfates, perborates, peracetates, percarbonates and the like, which catalysts may be associated with activating systems such as redox systems involving versivalent metals and mild reducing agents. Generally also the polymerization medium will contain a chain-transfer agent such as a higher alkyl mercaptan on the order of dodecyl mercaptan which both moderates the molecular weights of the products and also assists in initiating the action of the catalysts in the polymerization. However, these will preferably be used in somewhat smaller quantities than is ordinarily the case when butadiene is being polymerized to produce a general purpose elastomer, as any residual chain transfer agent may unduly retard the reaction of the styrene added for graft copolymerization. Polymerization may be carried out at temperatures from about 40° C. to 80° C. or, in the case of the activated systems, may be carried out over a range including lower temperatures such as 0° C. to 80° C. The polymerization will usually be carried to a conversion of at least about 75% before the styrene is added for graft copolymerization thereon. Any unreacted butadiene and associated comonomer may optionally be, and preferably is stripped off from the latex before the styrene is added for graft copolymerization.

To the latex prepared as just described, there is added styrene in an amount sufficient to constitute at least 10% of the combined weight of this newly added styrene and the butadiene polymer or copolymer already in the latex. Polymerization is continued, either under the action of the catalyst originally supplied in the preparation of the butadiene polymer or copolymer latex, or by the action of supplemental catalysts of the same type. The polymerization conditions are continued until the amount of styrene which has graft copolymerized upon the butadiene polymer or copolymer latex amounts to from 10% to 80% of the entire resultant graft copolymer. The resultant latex may be coagulated at once to recover the graft copolymer for mill-mixing with the other constituents, or the latex may be used for blending with the other ingredients in latex form.

THE BUTADIENE POLYMER OR COPOLYMER

The preparation of polymers of this type follows closely the procedure described hereinabove under "The graft copolymers of styrene upon rubbery butadiene polymers and copolymers" down to the point just short of the addition of styrene for graft copolymerization. The range of monomers used and the proportions thereof will be same as for the graft copolymer substrates, i. e., the products must contain at least 60% butadiene, any balance being constituted of styrene and/or alpha-methyl styrene, with not more than 10% of any other unsaturated compounds. From the standpoint of low temperature properties in the final compositions of this invention, the straight homopolymers of butadiene, or copolymers containing 90–100% of butadiene and 0–10% of styrene will be found preferable. There will be no special restriction on the amount of chain transfer agents employed, since there will be no graft copolymerization reaction. In other respects, the preparation will be the same. There is no particular upper limit on the viscosity of the butadiene polymer or copolymer. Polymers having Mooney viscosities in excess of 180 ML–4 have been used successfully. Soft polymers, as low as 15 ML–4 have also been used. The latex produced in the polymerization reaction may either be coagulated and dried to recover the material for mill mixing with the other ingredients, or the latex may be used for blending with the other ingredients in latex form.

THE STYRENE POLYMER

These may be simple resinous homopolymers of styrene, or resinous copolymers thereof with alpha-methyl styrene. Such copolymers must contain at least 55% of styrene copolymerized therein. In addition to the styrene and/or alpha-methyl styrene, the resins may also contain small amounts, e. g. not over 10%, of other ethylenically unsaturated compounds copolymerizable with styrene. Such unsaturated compounds include mono-unsaturated compounds and conjugated diunsaturated compounds such as vinyl esters on the order of vinyl chloride, vinyl fluoride, vinyl acetate, acrylic compounds such as acrylic and methacrylic acids, esters, amides, and nitriles on the order of methyl methacrylate, ethyl acrylate, fumaronitrile and acrylonitrile; vinylidene compounds such as vinylidene chloride and trifluorochloroethylene; cyclic unsaturated compounds such as the nuclear chlorostyrenes, vinyl naphthalene, vinyl carbazole, acenaphthylene; and conjugated unsaturates such as butadiene, isoprene, chloroprene, 2,3-dichlorobutadiene, piperylene and the like. These latter named dienes will have a tendency to reduce the heat distortion points of the final compositions. For a more complete list of compounds known to copolymerize with styrene, reference is made to Krczil "Kurzes Handbuch Der Polymerisations—Technik, vol. II, Mehrstoff-Polymerization" pp. 726 and 727, the entries under "styrol." In massive form these resins are commonly prepared by heating the styrene and any comonomer at temperatures in the range of 100° C. to 200° C., with application of pressure if necessary to confine the monomers. The polymerization may also be carried out at lower temperatures by the addition of free-radical generating peroxidic catalysts such as benzoyl peroxide, acetyl peroxide, di-t-butyl peroxide, and the like. The polymerization may also be carried out in emulsion by the techniques described above under "The graft copolymers of styrene upon rubbery butadiene polymers and copolymers," the styrene and any comonomers replacing the butadiene, and the process being carried out to a point short of that at which the to-be-graft-copolymerized styrene is added. In such cases there will usually result a latex of polystyrene, which may either be coagulated to yield the solid powdery polystyrene, or may be used as such for blending with one or both of the other constituents in the form of latices. The most important variable in the polystyrene constituent is its molecular weight as reflected by its viscosity which is an increasing function of molecular weight). From the standpoints of ready processing and toughness of calendered sheet, lower viscosity resins, having relative viscosities in the range of 1.8–2.5 are preferable. In this specification, the "viscosity" given for any polystyrene designates the relative viscosity of the polystyrene in 1% toluene solution. There are indications that in some cases mixtures of high and low molecular weight polystyrenes may be advantageous.

THE COMPOUNDING OF THE COMPOSITIONS

The proportions in which the three essential components of the compositions of this invention should be supplied have been set out in detail above. The compositions within the broad range of the compositions of this invention, but more particularly containing a minimum of 45% of the styrene-type resin, constitute a preferred class. The properties of these preferred compositions, using the polymeric materials of Example I, are plotted on trilinear coordinates in the fragmentary charts of Figs. 1–3, in each of which the uppermost vertex (off-scale) represents the graft copolymer, the right-hand vertex (off-scale) represents the butadiene polymer or copolymer, and the left-hand vertex represents polystyrene. The preferred compositions lie within the area bounded by the line A, and the properties within this area are plotted as iso-lines, each of which is the locus of compositions having equal values of a given property, which property is indicated by the character of the iso-line (dotted, dot-dash, etc.) as set forth in the legend beside the figure on which the iso-line appears, the numerical value of the plotted property being indicated by the number adjacent the iso-line. From the diagrams of Figs. 1–3, it will be seen that, within this preferred area, there is a concurrence of excellence in impact strength, largely 3 foot-pounds or better; brittle temperature, −20° C. or better; Young's modulus, 90,000 pounds per square inch or better; and Rockwell hardness, at least in the higher polystyrene compositions, of 10 or better (R scale). It will be understood, of course, that the exact numerical values plotted in the trilinear charts of Figs. 1–3 are referable only to the compositions involving the particular set of epipolymer, polybutadiene and polystyrene set forth in Example I hereinbelow; however, the same qualitative trends will be observed in systems involving other sets of epipolymers, butadiene polymers and copolymers and polystyrene coming within the purview of this invention.

Referring to the mode of compounding the materials of this invention, one convenient method is to thoroughly mix together latices containing the several components, and thereafter to add a coagulating agent to cause all the materials to be simultaneously coprecipitated from the mixed latex. This method has the advantage of ready and accurate measurement, a somewhat more thorough and reliable blending, and a saving in power expenditure over mill mixing. The alternative is, of course, to blend solid components by means of a roll mill, Banbury mill or the like. No great difference in properties between compositions prepared by the two methods has been noted.

Compositions according to this invention may be used in a variety of applications, and those containing from 55% to 85% of polystyrene, based on the weight of the three essential components, are of particular advantage in relatively heavy semi-rigid sheetings approximately .05 to .3 inch thick adapted for use directly as flat panellings etc. or for postforming into simple or compound curved panellings for automotive and other vehicle interiors, automotive wheel housings, formed luggage shells and the like; sink and drainboard shells and other plumbing equipment, counters and enclosures; interior architectural trim; appliance standards, racks and the like; large display letters, signs and the like; sales racks; tote-boxes for use in manufacturing and order-assembling establishments; and cabinets for radio and television receivers. The compositions are readily calendered out at moderate temperatures into sheetings of the type above described, and withstand the necessary hot working without noticeable change in properties or appearance; the sheetings may be post-formed at relatively low temperatures, and accept relatively deep draws without undue localized attenuation. In the finished fabricated articles the materials have excellent dimensional stability and sufficiently high heat distortion points, usually 85–90° C. or better, so as to hold any shapes into which they may be fabricated. Their excellent impact strengths ensure their freedom from cracking or shattering under any stresses and shocks likely to be encountered in service. This excellent impact strength is retained even at low temperatures, which is important in the case of vehicle panellings, which may be exposed to winter temperatures.

The compositions of this invention may also be employed for compression and injection molding of various objects, and in this application combine the excellent strength, hardness and dimensional stability of polystyrene with a greatly improved impact strength and resistance to flex fatigue. Compositions for this purpose should preferably contain from 85% to 95% of polystyrene, based on the weight of the three essential components. The compositions may be extruded to form beadings, sealer strips, tubing and the like and, particularly the blends containing low molecular weight polystyrene, may be extruded as thin tubes or sheets which may be blown or otherwise stretched to form thin, flexible wrapping etc. films. Further, the compositions may be applied in the form of mixed latices without being first coprecipitated to the solid form; for instance the mixed latices may be used for coating and impregnating, and for the casting of self-supporting flexible wrapping films.

With the foregoing general discussion in mind, there are given herewith detailed examples of the practice of this invention. All parts given are by weight.

*Example I.—Polymer proportion study*

A. Preparation of substrate:

| | Parts |
|---|---|
| Butadiene (containing about 2% divinyl benzene as impurity) | 100 |
| Water (demineralized) | 330 |
| Soap flakes (sodium oleate and stearate) | 7.5 |
| Potassium persulfate | 0.7 |
| Dodecyl mercaptan | 0.05 |

It will be noted that the above formula contains less than the conventional amount of modifier (dodecyl mercaptan).

The polymerization was carried out in a closable reactor provided with a heating and cooling jacket and with an anchor stirrer. The water, soap flakes, potassium persulfate and dodecyl mercaptans were charged in that order, with stirring to dissolve. The reactor was then closed, the reactor space above the liquid purged with butadiene vapor, and the formula amount of butadiene charged. The temperature was then raised to 140° F., and agitation commenced, this temperature and agitation being maintained for 24 hours, at which time the pressure had dropped to 30 pounds per square inch gauge. The butadiene was then vented with continued stirring of the contents of the reaction vessel. The latex remaining in the vessel contained about 30% of polybutadiene dispersed therein.

B. Preparation of the graft copolymer:

| | Parts |
|---|---|
| Polybutadiene latex (containing 30% of polybutadiene dispersed in an aqueous medium; prepared as just described) | 200 |
| Styrene | 40 |
| Potassium persulfate | 2 |
| Water (distilled) | 80 |

The latex, water, styrene and potassium persulfate were charged at 25° C. into a closable vessel in the order named, the residual air in the vessel purged with nitrogen, and the vessel sealed. The charge was then raised to 45° C. and agitated at this temperature for 18 hours. The resultant latex was stabilized by the addition of a stopping agent, and then filtered. The filtered latex was used in preparing compositions according to this invention.

C. Preparation of composition:

Graft copolymer latex (prepared as just described)
Polystyrene latex (relative viscosity of the resin in 1% toluene solution at 25° C. is 40.3: the latex contains 25% polystyrene by weight)
Standard GR-S latex (latex containing a rubbery copolymer of 70% butadiene, 30% styrene by weight, the copolymer constituting 30% by weight of the latex)

Sufficient to provide proportions of materials as indicated in Table I.

A series of compositions was made up, containing the above graft copolymer, polystyrene and GR-S copolymer in various proportions as set forth in Table I hereinbelow. In each case, amounts of the above listed latices, calculated to contain the polymers in the quantities selected for the particular composition, were thoroughly mixed together, and coagulated by addition of a 1% aqueous solution of calcium chloride. The coagulum was then dewatered on a filter, washed with water on the filter, dried, milled on a roll mill at 310–320° F. for 20 minutes, sheeted off as a sheet about 3/16 inch thick, and the sheet cooled. The sheet was then press-polished at 350° F. in a flat-platen press, the cycle being 9 minutes preheat without pressure, 1 minute under a pressure of 100 pounds per square inch, five minutes cooling to room temperature under 100 pounds per square inch, and removal from the press.

From the sheets whose compositions fell within the area bounded by the line A in Figs. 1 and 4 there were post-formed automobile door inside panels with integral arm rest (Chevrolet 1950) by heating the sheets to 320° F., pressing out in mating wooden dies, and cooling in the dies. The draw at the arm rest involved an increase in area of about 600%, but no trouble was encountered from local attenuation. The products had excellent dimensional stability and gave highly satisfactory service in use.

The sheet made from the composition of item No. 21 in Table I was gunfire tested at −40° F. at a range of 12 feet with .45 caliber ammunition. The perforation was a clean circular hole 5/8 inch in diameter, and the sheet was free from radical cracking and exhibited only slight concentric cracking.

Likewise, from samples of the sheets, the mechanical properties of the compositions were determined and are set forth in Table I.

TABLE I

| Composition, percent by weight of— | | | Properties | | | | | | | Item No. |
|---|---|---|---|---|---|---|---|---|---|---|
| | | | Notched Izod Impact Strength (foot-pounds per inch of notch) | | | | Rockwell Hardness (R-Scale) | Young's Modulus (pounds per square inch at 25° C.) | Heat Dist. Point (° C.) | |
| Polystyrene | Graft Copolymer | GR-S | at 25° C. | at −30° C. | at −40° C. | at −50° C. | | | | |
| 100 | 0 | 0 | 0.3 | | | | 116 | 450,000 | 96 | 1 |
| 90 | 0 | 10 | 0.7 | | | | 105 | 335,000 | 93 | 2 |
| 85 | 15 | 0 | 0.3 | | | | 107 | 364,000 | 95 | 3 |
| 80 | 0 | 20 | (¹) | (¹) | (¹) | (¹) | | | | 4 |
| 77.2 | 13.7 | 9.1 | 4.3 | 0.8 | | | 87 | 286,000 | 95 | 5 |
| 70.8 | 12.5 | 16.7 | 4.9 | 1.1 | | | 67 | 226,000 | 94 | 6 |
| 70 | 30 | 0 | 0.3 | | | | 91 | 294,000 | 91 | 7 |
| 65.4 | 11.5 | 23.1 | 4.2 | 1.5 | | | 37 | 173,000 | 90 | 8 |
| 65 | 20 | 15 | 4.2 | 1.4 | 0.6 | | 53 | 204,000 | 89 | 9 |
| 63.6 | 27.3 | 9 | 14.9 | 1.5 | 0.8 | | 67 | 200,000 | 93 | 10 |
| 58.3 | 25 | 16.7 | 6.0 | 4.8 | 1.5 | 0.6 | 42 | 159,000 | 92 | 11 |
| 53.8 | 23.1 | 23.1 | 6.0 | 5.6 | 2.8 | 0.6 | 11 | 120,000 | 90 | 12 |
| 50 | 50 | 0 | 0.3 | | | | 59 | 174,000 | 83 | 13 |
| 45.5 | 45.5 | 9.1 | 5.1 | 4.4 | 2.0 | 0.4 | 31 | 130,000 | 74 | 14 |
| 41.6 | 41.6 | 16.7 | 5.8 | 6.1 | 6.3 | 0.7 | 7 | 103,000 | 82 | 15 |
| 38.5 | 38.5 | 23.1 | 6.0 | 7.8 | 8.6 | 7.0 | −4 | 82,000 | 75 | 16 |
| 30 | 60 | 10 | | | 5.9 | | | 97,000 | | 17 |
| 25 | 70 | 5 | | | 5.4 | | | 111,000 | | 18 |
| 25 | 50 | 25 | | | 9.8 | | | 69,000 | | 19 |
| 20 | 80 | 0 | | | 3.1 | | | 109,000 | | 20 |
| 20 | 60 | 20 | | | 9.0 | | | 59,000 | | 21 |
| 15 | 70 | 15 | | | 8.3 | | | 59,000 | | 22 |
| 15 | 50 | 35 | | | 11.5 | | | 27,000 | | 23 |
| 10 | 80 | 10 | | | 7.8 | | | 55,000 | | 24 |
| 10 | 60 | 30 | | | 9.0 | | | 32,000 | | 25 |
| 5 | 90 | 5 | | | 6.5 | | | 62,000 | | 26 |
| 5 | 70 | 25 | | | 9.7 | | | 29,000 | | 27 |
| 0 | 100 | 0 | 2.9 | | | | 9 | 45,000 | 54 | 28 |
| 0 | 80 | 20 | | | 9.1 | | | 21,000 | | 29 |
| 0 | 50 | 50 | | | 7.9 | | (²) | (²) | (²) | 30 |

¹ Weak and cheesy.  ² Too soft for test.

*Example II.—Variation of the constitution of the individual polymeric constituents*

|  | Parts by weight of solids in latex |
|---|---|
| Polystyrene latex (relative viscosity varied as indicated in Table II) | 65 |
| Graft copolymer latex (prepared as in Example I, except that the ratio of styrene to polybutadiene latex was varied as indicated in Table II) | 20 |
| Butadiene-styrene copolymer latex (prepared as indicated in Table II) | 15 |

A series of compositions was made up, using various combinations of latices, containing various graft copolymers, polystyrene and butadiene copolymers prepared as indicated in Table II. In each case, the latices, in quantities sufficient to yield the amounts of the respective polymeric substances indicated above, were blended, coagulated and worked up into press-polished sheets as in Example I. Tabulated herewith are the properties of the several compositions.

Each composition was worked up into sheets by the process of Example I. The properties of the resultant products are set forth herewith in Table III.

TABLE III

| Weight Ratio Polystyrene/Graft Copolymer/GR-S | Izod Impact Strength (foot-pounds per inch notch) at— | | Rockwell Hardness (R-scale) | Young's Modulus (pounds per square inch at 25°C.) | Item No. |
|---|---|---|---|---|---|
| | 25°C. | −30°C. | | | |
| 53/40/7 | 4.7 | 3.9 | 51 | 168,000 | 1 |
| 65/20/15 (cf. Table II Item 7) | 4.9 | 1.4 | 58 | 191,000 | 2 |
| 72/15/13 | 4.5 | 1.2 | 69 | 253,000 | 3 |
| 80/10/10 (cf. Example III) | 3.9 | 0.8 | 84 | 330,000 | 4 |

From the table, it will be evident that the properties of the compositions of this example follow the same qualitative trends with variation of the proportions of the several polymer constituents as do the compositions of Ex-

TABLE II

| Nature of Individual Constituents | | | Notched Izod Impact Strength at— | | Rockwell Hardness (R-scale) | Young's Modulus (pounds per square inch at 25° C.) | Item No. |
|---|---|---|---|---|---|---|---|
| Relative Viscosity of Polystyrene in 1% Toluene at 25° C. | Percent Styrene in Graft Copolymer | Butadiene-Styrene Copolymer Used | 25° C. | −30° C. | | | |
| 2.0 | 40 | (¹) | 4.0 |  | 57 | 244,000 | 1 |
|  | 10 | (¹) | 3.0 | 1.1 | 45 | 175,000 | 2 |
|  | 20 | (¹) | 4.2 | 1.4 | 49 | 168,000 | 3 |
| 40.3 | 40 | (¹) (cf. Ex. I, item 9) | 4.2 | 1.4 | 53 | 204,000 | 4 |
|  |  | (²) | 1.5 | 0.2 | 87 | 270,000 | 5 |
|  | 60 | (¹) | 6.6 | 0.8 | 69 | 220,000 | 6 |
|  | 40 | (¹) | 4.9 | 1.4 | 58 | 191,000 | 7 |
| 47.0 |  | (²) | 4.5 | 0.3 | 63 | 223,000 | 8 |
|  | 80 | (¹) | 3.7 | 0.5 | 84 | 275,000 | 9 |
|  |  | (³) | 0.8 | 0.3 | 88 | 220,000 | 10 |

¹ Commercial type of GR-S copolymer containing 70% butadiene and 30% styrene.
² This is a butadiene homopolymer.
³ This is a copolymer of equal parts of butadiene and styrene, polymerized in a rosin soap system, having a Mooney viscosity of 100.

*Example III.—Injection molding composition*

|  | Parts by weight of solids in latex |
|---|---|
| Latex of a polystyrene having a relative viscosity of 22.0 in 1% toluene solution | 80 |
| Graft copolymer latex (as in Example I, containing 40% of styrene on 60% of polybutadiene) | 10 |
| Standard GR–S latex (as in Example I, 70% butadiene, 30% styrene) | 10 |

A press-polished composition sheet was made up from the above ingredients in accordance with the procedure of Example I. The sheet had the following properties: Rockwell R hardness 87; modulus of elasticity 270,000 pounds per square inch; Izod impact strength in foot pounds per inch of notch, 1.5 at 25° C., 0.3 at −20° C. The composition was injection molded at 170° C. under a pressure of 20,000 pounds per square inch to form a washing machine agitator. The molded article exhibited excellent dimensional stability, shock resistance, and wear resistance under service conditions.

*Example IV.—Further polymer proportion study*

A series of compositions was made up, using the polystyrene latex, graft copolymer latex and GR–S latex of item 7 of Table II, the proportions of the several latices being varied to provide the weight ratios of polystyrene, graft copolymer and GR–S as indicated in Table III.

ample I being, however, displaced from the absolute values of the corresponding properties of compositions of Example I by reason of the different polystyrene employed. It will also be noted that values of Young's modulus and impact strength in the case of Table III, Item 4 are greater than those in the case of the composition of Example III, which is identical with the composition of Table III, Item 4 except that a lower viscosity polystyrene is used.

*Example V.—Composition containing copolymers of styrene and alpha-methyl styrene*

A. Preparation of styrene-alpha-methyl styrene copolymer:

|  | Parts |
|---|---|
| Styrene | 58 |
| Alpha-methyl styrene | 42 |
| Water | 200 |
| Soap Flakes (sodium oleate and stearate) | 2.0 |
| Potassium persulfate | 0.4 |

The above ingredients were charged into a polymerization bottle, which was swept out with nitrogen and sealed. The bottle was then tumbled at 65° C. for 18 hours. The resultant latex was coagulated with an aqueous calcium chloride solution, washed with water, dewatered on a filter, and dried at 60° C. The resultant resin had a relative viscosity, in 1% toluene solution, of 4.5.

B. Compounding:

| | Parts |
|---|---|
| Copolymer of alpha-methyl styrene and styrene (prepared as just described) | 85 |
| Graft copolymer (free of divinyl benzene, otherwise (prepared as described in Example I) | 5 |
| GR–S (a commercial copolymer of 70% butadiene, 30% styrene) | 10 |

The above ingredients were blended together on a roll mill, and injection molded at 370° F. into test specimens 3 inches x ½ inch x 1/10 inch. The following properties were obtained on these test specimens.

TABLE IV

| | |
|---|---|
| Rockwell R hardness | 99 |
| Young's modulus (pounds per square inch) | 357,000 |
| Heat distortion temperature, ° C | 106 |

Izod impact strength (foot pounds per inch notch):

| | |
|---|---|
| At 25° C | 2.1 |
| At 0° C | 1.7 |
| At —20° C | 1.2 |

The product was likewise injection molded to form small paint containers, and snap-on lids therefor. The resiliency and dimensional stability of this material was demonstrated by repeated application and removal of the lids to and from the containers.

*Example VI.—Further compositions containing a copolymer of styrene and alpha-methyl styrene*

A. Preparation of the butadiene-styrene copolymer:

| | Parts |
|---|---|
| Butadiene | 90 |
| Styrene | 10 |
| Water | 200 |
| Sodium oleate | 2 |
| Potassium persulfate: | |
| Original | 0.25 |
| Increment | 0.15 |
| Dodecyl mercaptan | 0.1 |

The above ingredients, excepting the incremental potassium persulfate, were charged into a stainless steel pressure vessel provided with an agitator revolving at 400 revolutions per minute. The temperature was adjusted to 122° F. for 15 hours, and thereafter raised to 148° F. After four hours at 148° F. the incremental portion of potassium persulfate was added. Polymerization was then continued until an analysis of the solids in the latex indicated that 85% of the monomer had been polymerized, whereupon the latex was cooled, and stabilized by the addition of a phenolic stabilizer. The Mooney ML viscosity of the elastomer in the latex was 178.

B. Preparation of the styrene-alpha methyl styrene copolymer:

| | Parts |
|---|---|
| Styrene | 70 |
| Alpha-methyl styrene | 30 |
| Water | 200 |
| Soap flakes (sodium oleate and stearate) | 2.0 |
| Potassium persulfate | 0.4 |
| Dodecyl mercaptan | 0.1 |

The above ingredients were charged into a stainless steel pressure vessel provided with a stirrer revolving at 400 revolutions per minute. The temperature was adjusted to 65° C., and polymerization conducted at this temperature for 18 hours. The resin contained in the resultant latex had a relative viscosity, in 1% toluene solution, of 2.4.

C. Compounding:

TABLE V

| | Parts by Weight of Solids in Latex | |
|---|---|---|
| | No. 1 | No. 2 |
| Butadiene-styrene copolymer latex | 10 | 3.5 |
| Styrene-alpha-methyl styrene copolymer latex | 85 | 95 |
| Graft copolymer latex (prepared as described in Example I, but free of divinyl benzene) | 5 | 1.5 |

Two compositions, Nos. 1 and 2, were made up as indicated by the above schedule. In each case the latices, in the proportions indicated, were mixed and then coagulated by addition of an aqueous calcium chloride solution. The coagulum was washed with water on a filter, dried, and then injection molded at 170° C. under a pressure of 20,000 pounds per square inch into test specimens 3 inches by 1 inch by 0.1 inch. Following are the properties of these specimens.

TABLE VI

| | Composition | |
|---|---|---|
| | No. 1 | No. 2 |
| Hardness (Rockwell R Scale) | 96 | 111 |
| Modulus of Elasticity (pounds per sq. inch) | 334,000 | 432,000 |
| Heat Distortion Temperature (° C.) | 95 | 98.5 |
| Izod Impact Strength (Foot pounds per inch notch): | | |
| At 25° C | 4.4 | 1.0 |
| At —25° C | 1.1 | |
| Shrinkage after 1 hour in boiling water | 0 | 0 |

*Example VII.—General purpose compositions*

TABLE VII

| | Parts by Weight of Solids in Latex | |
|---|---|---|
| | No. 1 | No. 2 |
| Butadiene-styrene copolymer latex (copolymer contains 90% butadiene, 10% styrene, prepared as described in Example VI) | 10 | 3.5 |
| Polystyrene latex (relative viscosity of polystyrene in latex is 2.5) | 85 | 95 |
| Latex of graft copolymer of 40% styrene on 60% of butadiene: prepared as in Example I, but contains no divinyl benzene | 5 | 1.5 |

Two compositions, Nos. 1 and 2, were made up as indicated in the above schedule. In each case the latices, in the proportions indicated, were mixed and then coagulated by addition of an aqueous solution of calcium chloride. The coagulum was washed with water on a filter, dried, and then injection molded at 170° C. under a pressure of 20,000 pounds per square inch into test speciments 3 inches by 1 inch by 0.1 inch. Following are the properties of the specimens:

TABLE VIII

|  | Composition | |
|---|---|---|
|  | No. 1 | No. 2 |
| Hardness (Rockwell, R scale) | 92 | 106 |
| Modulus of elasticity (pounds per square inch) | 337,000 | 407,000 |
| Heat distortion temperature (°C.) | 88 | 91 |
| Impact Strength (Izod, foot pounds per inch of notch): | | |
| At 25° C | 4.7 | 2.0 |
| At −25° C | 2.2 | ------ |
| Shrinkage after 1 hour in boiling water | 6 | 6 |

*Example VIII.—Compositional studies with miscellaneous combinations of polymeric constituents injection molding*

Ternary combinations of various graft copolymers, butadiene elastomers and polystyrenes were exploded over various ranges of relative proportions of the components, as indicated in Tables VIII and IX. In Table VIII, the compositions are classified first as to the graft copolymer, second as to butadiene elastomer, and third as to viscosity of the polystyrene used. Table IX repeats much of the same data, but ordered primarily as to the ratios of the constituents. These compositions were prepared by blending of latices of the constituents and coagulating the mixed latices by addition of a 1% aqueous solution of calcium chloride. The coagulum was dewatered on a filter, washed on the filter with water, dried, milled on a roll mill at 310–320° F. for 20 minutes and sheeted off. The sheet was then diced into cubes about one-eighth inch on each side, and the cubes used as a resin supply in an injection molding press to form test specimens 3 inches by 0.5 inch by .125 inch. Molding pressure was 20,000 pounds per square inch and molding temperature was 380° F. Mechanical properties of these test specimens were determined and are set forth in Tables VIII and IX along with the compositions from which the respective specimens were made.

TABLE VIII.—COMPOSITIONAL STUDIES—WITH VARIOUS DIFFERENT POLYMERIC CONSTITUENTS

| Components Used | | | | Properties of Product | | | | | Item No. |
|---|---|---|---|---|---|---|---|---|---|
| A | B | C | | Hardness (Rockwell R) | Modulus, p.s.i. | Heat Distortion Temp. °C.) | Impact Strength | | |
| Graft Copolymer | Butadiene Elastomer | Relative Viscosity of Polystyrene | Weight Ratio, A/B/C | | | | 25° C. | −30° C. | |
| Graft Copolymer of 40 parts of styrene upon 60 parts of a polybutadiene containing a small proportion of divinyl benzene (prepared as described in Example I). | Low (50) Mooney butadiene-styrene copolymer containing 75% butadiene, balance styrene. | 47 | 70/5/25 | −5 | 81,500 | 63 | ---- | 5.2 | 1 |
| | | | 25/9/66 | 70 | 215,000 | 90 | ---- | 1.5 | 2 |
| | | | 55/6.25/38.75 | 20 | 119,000 | 79 | ---- | 4.2 | 3 |
| | | | 40/7.5/52.5 | 55 | 173,000 | 80 | ---- | 3.3 | 4 |
| | | | 40/7/53 | 47 | 169,000 | 82 | ---- | 4.8 | 5 |
| | | | 15/13/72 | 75 | 250,000 | 92 | ---- | ------ | 6 |
| | | | | 89 | 313,000 | 92 | ---- | ------ | 7 |
| | | | 10/10/80 | 91 | 299,000 | 93 | ---- | 0.6 | 8 |
| | | | 5/20/75 | 59 | ------ | ------ | ---- | 0.8 | 9 |
| | Low (50) Mooney Copolymer of 90% butadiene, 10% styrene, copolymerized at 5° F. | 2.6 | 6.25/18.75/75 | 63 | ------ | ------ | ---- | 0.7 | 10 |
| | | | 8/17/75 | 64 | 281,000 | 93 | ---- | 1.2 | 11 |
| | | | 10/15/75 | 65 | ------ | ------ | ---- | 0.8 | 12 |
| | | | 15/10/75 | 76 | ------ | ------ | ---- | 0.5 | 13 |
| | | | 5/15/80 | 76 | 309,000 | 94 | ---- | 0.4 | 14 |
| | | | 6/14/80 | 78 | 309,000 | 95 | ---- | 0.6 | 15 |
| | | | 7/13/80 | 80 | 361,000 | 98 | ---- | 0.6 | 16 |
| | | | 10/15/75 | 70 | ------ | ------ | ---- | 0.8 | 17 |
| | | 25 | 12.5/12.5/75 | 55 | ------ | ------ | ---- | 0.9 | 18 |
| | | | 20/5/75 | 78 | ------ | ------ | ---- | 0.6 | 19 |
| | | | Ratio C/A/B | Weight Ratio A/B/C | | | | | |
| Graft copolymer of 40 parts of styrene upon 60 parts of polybutadiene free of divinyl benzene. Otherwise prepared as described in Example I. | Unmodified high conversion polybutadiene. | ª 4.7 | 65/17.5/17.5 | 17.5/17.5/65 | 59 | 233,000 | 85 | ---- | 3.1 | 20 |
| | | | 10/15/75 | 15/75/10 | 90 | 322,000 | 91 | ---- | 1.1 | 21 |
| | | | 95/1.4/3.6 | 1.4/3.6/95 | 108 | 420,000 | 92 | ---- | 0.8 | 22 |
| | | | 95/2.2/2.8 | 2.2/2.8/95 | 108 | 405,000 | 92 | ---- | 0.9 | 23 |
| | | ª 5.1 | 75/10/15 | 10/15/75 | 77 | 272,000 | 89 | ---- | 2.1 | 24 |
| | | | 85/5/10 | 5/10/85 | 94 | 315,000 | 93 | ---- | 1.5 | 25 |
| | High (150) Mooney Low temperature copolymer of 90% butadiene, 10% styrene. | ª 4.1 | 65/15/20 | 15/20/65 | 57 | ------ | ------ | ---- | ------ | 26 |
| | | | 65/10/25 | 10/25/65 | 59 | ------ | ------ | ---- | ------ | 27 |
| | | | 65/17.5/17.5 | 17.5/17.5/65 | 62 | ------ | ------ | ---- | ------ | 28 |
| | | | 65/20/15 | 20/15/65 | 62 | ------ | ------ | ---- | ------ | 29 |

ª This is the weighted average of the relative viscosities of two polystyrene resins blended for use in these samples.

TABLE IX

| Weight Ratio, C/A/B | | | Nature of Components | | | Properties of the Product | | | | | |
|---|---|---|---|---|---|---|---|---|---|---|---|
| C | A | B | A<br>Graft Copolymer | B<br>Elastomer | C<br>Relative Viscosity of Polystyrene | Rockwell Hardness R | Modulus, p. s. i. | Heat Distortion Temp. (° C.) | Izod Impact Strength (foot pounds per inch of notch at— | | Item No. |
| | | | | | | | | | 25° C. | −30° C. | |
| 53 | 40 | 7 | 40% styrene on 60% polybutadiene contains small amount of divinyl benzene. | 75% butadiene, 25% styrene copolymer, 40–60 Mooney. | 31<br>47 | 58<br>55 | 171,000<br>173,000 | 90<br>80 | ----<br>---- | ------<br>3.3 | 1<br>2 |
| 65 | 8.75 | 26.25 | 40% styrene on 60% polybutadiene, contains a small amount of divinyl benzene. | Copolymer of 90% butadiene, 10% styrene, 40–60 Mooney. | 1.6<br>3.0 | 74<br>71 | 313,000<br>224,000 | 90<br>91 | ----<br>---- | ------<br>------ | 3<br>4 |
| | 17.5 | 17.5 | Same, but contains no divinyl benzene. | Unmodified high conversion polybutadiene. | *4.7<br>*4.1 | 59<br>62 | 233,000<br>------ | 85<br>------ | ----<br>---- | 3.1<br>------ | 5<br>6 |
| | | | | 90% Butadiene, 10% styrene, 150 Mooney copolymer. | 5.1 | ------ | ------ | ------ | ---- | ------ | 7 |
| 72 | 15 | 13 | 40% styrene, 60% of polybutadiene, contains a small amount of divinyl benzene. | 75% Butadiene, 25% styrene, 50 Mooney copolymer. | 20<br>47 | 72<br>15 | 263,000<br>250,000 | 88<br>92 | ----<br>---- | 0.7<br>------ | 8<br>9 |
| 75 | 8 | 17 | Same | 90% Butadiene, 10% styrene, 50 Mooney copolymer. | 1.7 | 67 | 287,000 | 90 | ---- | 0.5 | 10 |
| | | | Same, but free from divinyl benzene. | Same | 2.5 | 62 | 275,000 | 81 | ---- | 1.1 | 11 |
| | | | Same, but contains divinyl benzene. | Same | 2.5<br>2.6<br>2.6 | 67<br>62<br>64 | 268,000<br>275,000<br>281,000 | ------<br>------<br>93 | ----<br>----<br>---- | 1.0<br>1.1<br>1.2 | 12<br>13<br>14 |
| | 10 | 15 | 40% styrene on 60% polybutadiene contains small amount of divinyl benzene. | 90% Butadiene, 10% styrene copolymer, 40–60 Mooney. | 2.6<br>2.5 | 65<br>70 | ------<br>------ | ------<br>------ | ----<br>---- | 0.8<br>0.8 | 15<br>16 |
| | | | Same, but contains no divinyl benzene. | Unmodified high conversion polybutadiene. | *4.7<br>*4.7 | ------<br>77 | ------<br>272,000 | ------<br>85 | ----<br>---- | 0.9<br>3.1 | 17<br>18 |
| | | | | 90% Butadiene, 10% styrene copolymer, 150 Mooney. | *5.1<br>*5.1 | 77<br>69 | 272,000<br>268,000 | 89<br>82 | ----<br>---- | 2.1<br>0.9 | 19<br>20 |
| 85 | 5 | 10 | Same | Unmodified high conversion polybutadiene. | 4.5<br>4.7<br>5.1 | 90<br>90<br>94 | 357,000<br>322,000<br>315,000 | 106<br>91<br>93 | ----<br>----<br>---- | 1.0<br>1.1<br>1.5 | 21<br>22<br>23 |
| | | | | 90% Butadiene, 10% styrene copolymer, 178 Mooney viscosity. | 2.5 | 92 | 337,000 | 88 | 4.7 | 2.0 | 24 |
| 95 | 1.5 | 3.5 | Same | Same | 2.5 | 106 | 407,000 | 91 | 2.0 | ------ | 25 |

\* See footnote, Table VIII.

*Example IX.— Variation of polystyrene level and viscosity with various butadiene elastomers*

Polystyrene (relative viscosity in 1% toluene solution per Table X.)  65, 70, 75 or 80 parts.

Mixture of equal parts of:
Graft copolymer (containing 40% of styrene epipolymerized on polybutadiene, prepared as described in Example I, except that the monomers are free of divinyl benzene).
Butadiene elastomer (per Table X) } 35, 30, 25 or 20 parts (q. s. to make a total of 100 parts with the polystyrene).

A series of compositions was made up, using various combinations of polystyrenes, graft copolymers and butadiene elastomers in various proportions within the scope of the above schedule and as set forth below in Table X. In the case of each composition, latices of the selected polystyrene, graft copolymer and butadiene elastomer, in proportions sufficient to provide the components in the proportions selected for that composition, were thoroughly mixed together, coagulated by the addition of a 1% aqueous solution of calcium chloride, dewatered and washed with water on a filter, and dried.

The several compositions were then sheeted out on a mill to a thickness of .015–.020 inch, laid up as a 5-ply laminate, and then pressed together, in a smooth, flat-platen press at a temperature of 180° C. and at a pressure of 100 pounds per square inch. Set forth herewith in Table X are the compositions prepared and the properties determined thereon:

TABLE X

| Butadiene Elastomer | Polystyrene Viscosity | Polystyrene Parts Used | Hardness, Rockwell R Scale | Modulus of Elasticity, Pounds per square inch | Heat Distortion Temp. (°C.) | Izod Impact Strength (Foot Pounds Per Inch of Notch) at (° C.) 25 | -10 | -25 | -30 | -35 | -40 | -45 | Percent Shrinkage at °C. 145 | 165 | Run No. |
|---|---|---|---|---|---|---|---|---|---|---|---|---|---|---|---|
| A copolymer of 90% butadiene, 10% styrene by weight, copolymerized at low temperatures, 140 Mooney viscosity | 1.6 | 65 | 57 | 216,000 | 82 | 8.6 | | 4.8 | 4.1 | | 3.7 | 3.1 | 21 | 23 | 1 |
| | | 70 | 68 | 230,000 | 77 | 5.9 | | 1.9 | | 1.3 | 1.4 | 0.8 | 0.5 | 2.5 | 2 |
| | 2.1 | 65 | 58 | 212,000 | 82 | 8.6 | | 4.6 | 3.6 | 3.0 | 2.8 | 2.1 | 4 | 6 | 3 |
| | | 65 | 59 | 230,000 | 87 | 13.2 | | 8.5 | | 7.9 | | 5.5 | 0.5 | 0.5 | 4 |
| | 2.5 | 70 | 72 | 247,000 | 81 | 9.7 | | 5.2 | | | 3.2 | 1.9 | 2.0 | 2.0 | 5 |
| | | 75 | 80 | 268,000 | 88 | 1.1 | 0.8 | | | | | 0.8 | 3.5 | 4.0 | 6 |
| | 5.0 | 65 | 69 | 218,500 | 87 | 10.6 | | 6.7 | 6.5 | 6.4 | 6.2 | 5.9 | 1.0 | 2.5 | 7 |
| | | 70 | 77 | 244,000 | 89 | 10.2 | | 4.9 | 4.5 | | 1.4 | 1.0 | 1.0 | 1.5 | 8 |
| | ¹ 9.3 | 80 | 87 | 312,000 | 83 | 1.1 | 0.9 | | | | | | 0.5 | 0.5 | 9 |
| | ¹ 9.5 | 70 | 73 | 251,000 | 83 | 5.8 | | 1.4 | | | 1.2 | 0.7 | 1.0 | 2.5 | 10 |
| | ¹ 9.8 | 75 | 81 | 277,000 | 89 | 5.4 | 3.9 | 1.1 | 1.0 | | | | 1.0 | 1.0 | 11 |
| | ¹ 9.9 | 70 | 71 | 252,000 | 87 | 8.8 | | | | | | | 0 | 1.5 | 12 |
| | ¹ 10.1 | 65 | 60 | 209,000 | 83 | 8.6 | | 3.6 | 3.0 | 2.8 | 2.9 | 2.5 | 1 | 1 | 13 |
| | ¹ 10.3 | 70 | 75 | 239,000 | 83 | 9.6 | | 4.6 | 3.7 | 3.1 | 1.9 | 0.9 | 1.5 | 3.0 | 14 |
| | | 65 | 62 | 208,000 | 81 | 8.7 | | 4.7 | 4.2 | 3.9 | 3.5 | 1.0 | 2.0 | 5.0 | 15 |
| | ¹ 10.5 | 70 | 74 | 249,000 | 91 | 9.0 | | 4.3 | 3.7 | 3.1 | 1.4 | | 1.0 | 1.0 | 16 |
| | ¹ 11.0 | 65 | 65 | 228,000 | 86 | 11.6 | | 6.9 | | | 6.4 | 4.2 | 0.5 | 2.0 | 17 |
| | ¹ 12.7 | 70 | 77 | 248,000 | 89 | 9.3 | | 5.1 | 4.3 | | 1.1 | 1.0 | 1.5 | 2.0 | 18 |
| | ¹ 13.4 | 65 | 69 | 242,000 | 88 | 11.4 | | 7.4 | 7.1 | | 5.8 | 1.8 | 2.0 | 4.0 | 19 |
| | | 60 | 60 | 208,000 | 85 | 9.8 | | 7.1 | 6.8 | | 6.3 | 5.7 | 4 | 6 | 20 |
| | 57 | 70 | 71 | 241,000 | 90 | 7.6 | | 5.0 | 5.0 | | 2.5 | 1.5 | 7.0 | 16 | 21 |
| | | 65 | 60 | 230,000 | 85 | 8.2 | 7.1 | 5.2 | 4.2 | 3.7 | 3.0 | 0.8 | 10 | 11 | 22 |
| | 2.5 | 70 | 70 | 240,000 | 88 | 3.2 | 3.9 | 0.9 | | | | | 2.0 | 7.0 | 23 |
| | | 75 | 80 | 265,000 | 87.5 | 1.2 | 1.0 | 0.6 | | | | | 1.5 | 1.5 | 24 |
| Copolymer of 87% butadiene, 17% styrene by weight | ¹ 9.3 | 80 | 87 | 321,000 | 84 | 0.7 | 0.7 | | | | | | 1.0 | 1.0 | 25 |
| | ¹ 9.8 | 75 | 81 | 288,000 | 85 | 2.2 | 0.9 | | | | | | 2.5 | 2.5 | 26 |
| | ¹ 10.3 | 70 | 73 | 246,000 | 85 | 9.3 | | 5.0 | 4.9 | | | 2.9 | 1.0 | | 27 |
| | ¹ 11.0 | 65 | 64 | 237,000 | 85 | 11.5 | | 7.2 | | 6.6 | | 3.8 | 1.5 | 1.5 | 28 |
| | | 65 | 62 | 204,000 | 81 | 8.5 | | 6.5 | 6.2 | 6.2 | 5.3 | 4.8 | 1.0 | 1.0 | 29 |
| Copolymer of 90% butadiene, 10% styrene by weight. 178 Mooney viscosity | 2.5 | 75 | 80 | 266,000 | 85 | 5.9 | | 2.0 | 1.4 | 0.9 | | | 1.0 | 2.0 | 30 |
| | ¹ 9.8 | 75 | 81 | 264,000 | 87 | 5.5 | | 1.1 | 0.9 | 0.9 | | | 2.0 | 2.0 | 31 |
| | ¹ 11.0 | 65 | 62 | 220,000 | 83 | 8.6 | | 6.2 | 6.3 | 6.0 | 5.3 | 4.1 | 1.0 | 1.0 | 32 |
| Polybutadiene, polymerized without modifier | 2.5 | 75 | 81 | 256,000 | 86 | 3.7 | | 1.2 | 0.8 | | | | 0 | 1.0 | 33 |
| | ¹ 9.8 | 75 | 83 | 265,000 | 86 | 3.4 | | 1.0 | 0.8 | | | | 1.0 | 2.5 | 34 |
| Copolymer of 70% butadiene, 30% styrene, 160 Mooney viscosity | ¹ 11 | 65 | 71 | 224,000 | 81.5 | 9.3 | | 5.3 | 2.7 | 0.7 | | | 3.0 | 6.0 | 35 |
| Copolymer of 70% butadiene, 30% styrene, 90 Mooney viscosity | ¹ 11 | 65 | 68 | 224,000 | 82 | 8.8 | | 5.0 | 0.8 | | | | 3.0 | 7.0 | 36 |
| Copolymer of 70% butadiene, 30% styrene, low viscosity | ¹ 11 | 65 | 66 | 234,000 | 82 | 7.4 | | 3.4 | 1.0 | | | | 2.0 | 5.0 | 37 |
| Copolymer of 70% butadiene, 30% styrene, 29 Mooney viscosity | ¹ 11 | 65 | 53 | 222,000 | 81 | 8.9 | | 6.4 | 4.2 | 0.9 | | | 0 | 3.0 | 38 |

¹ The polystyrene component was constituted by taking 10 parts of a polystyrene having a viscosity of 57 and adding 55, 60, etc. parts of another polystyrene to provide the total required polystyrene. The viscosity given is the weighted average of the viscosities of the two polystyrenes.

*Example X.—Optimum post-forming sheet*

|   | Parts by weight of solids |
|---|---|
| Polystyrene latex (containing resin of viscosity 2.5). | 75. |
| Graft copolymer latex (prepared as described in Example I but free of divinyl benzene). | 10, 12.5 or 15. |
| Butadiene/styrene 90/10 copolymer latex (prepared as described above in Example VI at "A"). | 15, 12.5 or 10 (q. s. to yield 100 parts total solids). |

The basic polymeric ingredients listed above appeared to be the best for the evident variety of applications, and it was accordingly desired to determine the optimum proportions thereof for post-forming sheets at the level of 75% polystyrene content. A series of compositions was made up from the above latices, using proportions to yield compositions as set forth in Table XI below. In each case, the latices were mixed and coagulated by addition of aqueous calcium chloride. The coagulum was washed with water on a filter, dried, and milled for ten minutes on a roll mill heated with steam at 110 pounds per square inch gauge. The composition was sheeted off at a thickness of 3/16 inch, and the sheet press-polished at 350° F. in a flat-platen press, the cycle being 9 minutes preheat without pressure, 1 minute under a pressure of 100 pounds per square inch, five minutes cooling to room temperature under 100 pounds per square inch, and removal from the press. Set forth herewith are the compositions of the products and the properties thereof.

TABLE XI

| Parts of Graft Copolymer Used | Parts of Butadiene Styrene Copolymer Used | Hardness (Rockwell R) | Modulus (Pounds per sq. in.) | Heat Distortion Temp. (° C.) | Izod Impact Strength (foot pounds per inch of notch) at (° C.) 25 | -25 | -30 | -35 | -40 | -45 |
|---|---|---|---|---|---|---|---|---|---|---|
| 10 | 15 | 79 | 258,000 | 87 | 7.6 | 4.1 | 3.2 | 2.4 | 1.4 | 0.7 |
| 12.5 | 12.5 | 80 | 260,000 | 86 | 6.9 | 2.9 | 2.7 | 1.8 | 1.0 | 0.7 |
| 15 | 10 | 80 | 278,000 | 85 | 4.9 | 1.6 | 1.0 | 0.8 | | |

The composition containing 10 parts of the graft copolymers appeared to offer the best combination of properties.

From the foregoing general description and detailed specific examples, it will be evident that this invention provides novel compositions having unique and excellent properties and combinations of properties, notably high impact strength, high heat distortion points, good cold properties and dimensional stability. The compositions may be worked up by simple and inexpensive techniques into a wide variety of useful objects. The essential starting materials for the compositions, butadiene and styrene, are cheaply and abundantly available.

This application is a continuation-in-part of the co-pending application of Robert A. Hayes Ser. No. 216,233, filed March 17, 1951, and now abandoned.

What is claimed is:

1. A composition comprising:

(A) A styrene-type resin—5 to 95%, based on the total weight of the ingredients A, B and C of this schedule, (B) A graft copolymer of styrene upon a butadiene elastomer—20 to 95%, based on the weight of the ingredients (B) and (C) of this schedule, and (C) A butadiene elastometer—5 to 80%, based on the weight of the ingredients (B) and (C) of this schedule said styrene resin (A) being selected from the group consisting of polystyrene and copolymers of styrene containing at least 55% of styrene, up to 40% of alpha-methyl styrene, and up to 10% of other ethylenically mono unsaturated compounds copolymerizable therewith, said graft copolymer (B) being selected from the group consisting of graft copolymers of from 10% to 80% of styrene upon homopolymers of butadiene and upon copolymers of butadiene containing at least 60% of butadiene together with up to 40% of styrene, up to 40% of alpha-methyl styrene and up to 10% of other ethylenically unsaturated compounds copolymerizable therewith, the maximum percentage of non-conjugated di-unsaturated compounds included in said other ethylenically unsaturated compounds being 3%, and said graft copolymers (B) further being produced by polymerizing styrene in the presence of said homopolymers and copolymers of butadiene, and said butadiene elastomer (C) being selected from the group consisting of homopolymers of butadiene and copolymers of butadiene containing at least 60% of butadiene and up to 40% of styrene, up to 40% of alpha-methyl styrene and up to 10% of other ethylenically unsaturated compounds copolymerizable therewith, the maximum amount of non-conjugated di-unsaturated compounds included in said other ethylenically unsaturated compounds being 3%, all of the above percentages of monomers being on the basis of the weight of the copolymers and graft copolymers in which they are contained.

2. A composition comprising:

(A) Polystyrene—5 to 95%, based on the total weight of the ingredients A, B and C of this schedule, (B) Graft copolymer of styrene upon a butadiene elastomer—20 to 95%, based on the weight of the ingredients (B) and (C) of this schedule, and (C) A butadiene elastomer—5 to 80%, based on the weight of the ingredients (B) and (C) of this schedule said graft copolymer (B) being selected from the group consisting of graft copolymers of from 10% to 80% of styrene upon homopolymers of butadiene and upon copolymers of butadiene containing at least 60% of butadiene together with up to 40% of styrene, up to 40% of alpha-methyl styrene and up to 10% of other ethylenically unsaturated compounds copolymerizable therewith, the maximum percentage of non-conjugated di-unsaturated compounds included in said other ethylenically unsaturated compounds being 3%, and said graft copolymers (B) further being produced by polymerizing styrene in the presence of said homopolymers and copolymers of butadiene, and said butadiene elastomer (C) being selected from the group consisting of homopolymers of butadiene and copolymers of butadiene containing at least 60% of butadiene and up to 40% of styrene, up to 40% of alpha-methyl styrene and up to 10% of other ethylenically unsaturated compounds copolymerizable therewith, the maximum amount of non-conjugated di-unsaturated compounds included in said other ethylenically unsaturated compounds being 3%, all of the above percentages of monomers being on the basis of the weight of the copolymers and graft copolymers in which they are contained.

3. A composition comprising:

(A) Styrene-alpha-methyl styrene copolymer—5 to 95%, based on the total weight of the ingredients A, B and C of this schedule, (B) A graft copolymer of styrene upon a butadiene elastomer—20 to 95%, based on the weight of the ingredients (B) and (C) of this schedule, and (C) A butadiene elastomer—5 to 80%, based on the weight of the ingredients (B) and (C) of this schedule said styrene-alpha-methyl styrene copolymer (A) containing at least 55% of styrene, up to 40% of alpha-methyl styrene and up to 10% of other ethylenically mono-unsaturated compounds copolymerizable therewith, said graft copolymer (B) being selected from the group consisting of graft copolymers of from 10% to 80% of styrene upon homopolymers of butadiene and upon copolymers of butadiene containing at least 60% of butadiene together with up to 40% of styrene, up to 40% of alpha-methyl styrene and up to 10% of other ethylenically unsaturated compounds copolymerizable therewith, the maximum percentage of non-conjugated di-unsaturated compounds included in said other ethylenically unsaturated compounds being 3%, and said graft copolymers (B) further being produced by polymerizing styrene in the presence of said homopolymers and copolymers of butadiene, and said butadiene elastomer (C) being selected from the group consisting of homopolymers of butadiene and copolymers of butadiene containing at least 60% of butadiene and up to 40% of styrene, up to 40% of alpha-methyl styrene and up to 10% of other ethylenically unsaturated compounds copolymerizable therewith, the maximum amount of non-conjugated di-unsaturated compounds included in said other ethylenically unsaturated compounds being 3%, all of the above percentages of monomers being on the basis of the weight of the copolymers and graft copolymers in which they are contained.

4. A composition comprising:

(A) A styrene-type resin—5 to 95%, based on the total weight of the ingredients A, B and C of this schedule (B) A graft copolymer of styrene upon a butadiene elastomer—20 to 95%, based on the weight of the ingredients (B) and (C) of this schedule, and (C) Polybutadiene—5 to 80%, based on the weight of the ingredients (B) and (C) of this schedule said styrene resin (A) being selected from the group consisting of polystyrene and copolymers of styrene containing at least 55% of styrene, up to 40% of alpha-methyl styrene, and up to 10% of other ethylenically mono-unsaturated compounds copolymerizable therewith, said graft copolymer (B) being selected from the group consisting of graft copolymers of from 10% to 80% of styrene upon homopolymers of butadiene and upon copolymers of butadiene containing at least 60% of butadiene together with up to 40% of styrene, up to 40% of alpha-methyl styrene and up to 10% of other ethylenically unsaturated compounds copolymerizable therewith, the maximum percentage of non-conjugated di-unsaturated compounds included in said other ethylenically unsaturated compounds being 3%, and said graft copolymers (B) further being produced by polymerizing styrene in the presence of said homopolymers and copolymers of butadiene, the above percentages of monomers being on the basis of the weight of the copolymers and graft copolymers in which they are contained.

5. A composition comprising:

(A) A styrene-type resin—5 to 95%, based on the total weight of the ingredients A, B and C of this schedule
(B) A graft copolymer of styrene upon a butadiene elastomer—20 to 95%, based on the weight of the ingredients (B) and (C) of this schedule, and
(C) A copolymer of 90% butadiene with 10% styrene—5 to 80%, based on the weight of the ingredients (B) and (C) of this schedule said styrene resin (A) being selected from the group consisting of polystyrene and copolymers of styrene containing at least 55% of styrene, up to 40% of alpha-methyl styrene, and up to 10% of other ethylenically mono-unsaturated compounds copolymerizable therewith, said graft copolymer (B) being selected from the group consisting of graft copolymers of from 10% to 80% of styrene upon homopolymers of butadiene and upon copolymers of butadiene containing at least 60% of butadiene together with up to 40% of styrene, up to 40% of alpha-methyl styrene and up to 10% of other ethylenically unsaturated compounds copolymerizable therewith, the maximum percentage of non-conjugated di-unsaturated compounds included in said other ethylenically unsaturated compounds being 3%, and said graft copolymers (B) further being produced by polymerizing styrene in the presence of said homopolymers and copolymers of butadiene, the above percentages of monomers being on the basis of the weights of the copolymers and graft copolymers in which they are contained.

6. A composition comprising:

(A) Polystyrene—5 to 95%, based on the weight of the ingredients (A), (B) and (C) of this schedule
(B) A graft copolymer of from 20% to 80% by weight of styrene upon polybutadiene, based on the weight of said graft copolymer, said graft copolymer having been produced by polymerizing styrene in the presence of polybutadiene—20 to 95%, based on the weight of the ingredients (B) and (C) of this schedule, and
(C) Polybutadiene—5 to 80%, based on the weight of the ingredients (B) and (C) of this schedule 7. A composition comprising:

(A) Polystyrene—5 to 95%, based on the weight of the ingredients (A), (B) and (C) of this schedule
(B) A graft copolymer of from 20% to 80% by weight of styrene upon polybutadiene, produced by polymerizing a styrene in the presence of polybutadiene—20 to 95% based on the weight of the ingredients (B) and (C) of this schedule, and
(C) A copolymer of 90% butadiene and 10% styrene by weight—5 to 80%, based on the weight of the ingredients (B) and (C) of this schedule the above percentages of monomers being based on the weight of the graft copolymer and copolymer in which they are contained.

8. A composition comprising:

(A) Copolymer of 70% of styrene and 30% of alpha-methyl styrene—5 to 95%, based on the weight of the ingredients (A), (B) and (C) of this schedule
(B) A graft copolymer of from 20% to 80% by weight of styrene upon polybutadiene, produced by polymerizing styrene in the presence of polybutadiene—20 to 95% based on the weight of the ingredients (B) and (C) of this schedule, and
(C) Copolymer of 90% butadiene, 10% styrene—5 to 80%, based on the weight of the ingredients (B) and (C) of this schedule the above percentages of monomers being on the basis of the weight of the copolymers and graft copolymers in which they are contained.

9. A composition comprising by weight:

| | Per cent |
|---|---|
| Polystyrene | 85 |
| A graft copolymer of from 20% to 80% by weight of the graft copolymer, of styrene upon polybutadiene, produced by polymerizing styrene in the presence of polybutadiene | 5 |
| and | |
| A copolymer of 90% butadiene with 10% styrene by weight | 10 |

10. A composition comprising by weight:

| | Per cent |
|---|---|
| A copolymer of 70% of styrene and 30% of alpha-methyl styrene | 85 |
| A graft copolymer of 40% of styrene upon 60% of polybutadiene by weight, produced by polymerizing styrene in the presence of polybutadiene | 5 |
| and | |
| A copolymer of 90% butadiene, 10% styrene by weight | 10 |

11. A composition comprising by weight:

| | Per cent |
|---|---|
| A copolymer of 70% of styrene and 30% of alpha-methyl styrene | 95 |
| A graft copolymer of 40% of styrene upon 60% of polybutadiene by weight, produced by polymerizing styrene in the presence of polybutadiene | 1.5 |
| and | |
| A copolymer of 90% butadiene, 10% styrene by weight | 3.5 |

12. A composition comprising by weight:

| | Per cent |
|---|---|
| Polystyrene | 65 |
| A graft copolymer of 40%, by weight of the graft copolymer, of styrene upon polybutadiene, produced by polymerizing styrene in the presence of polybutadiene | 17.5 |
| and | |
| Polybutadiene | 17.5 |

13. A sheet suitable for hot post-forming comprising:

(A) A styrene-type resin—55 to 85%, based on the total weight of the ingredients A, B and C of this schedule
(B) A graft copolymer of styrene upon a butadiene elastomer—20 to 95%, based on the weight of the ingredients (B) and (C) of this schedule, and
(C) A butadiene elastomer—5 to 80%, based on the weight of the ingredients (B) and (C) of this schedule said styrene resin (A) being selected from the group consisting of polystyrene and copolymers of styrene containing at least 55% of styrene, up to 40% of alpha-methyl styrene and up to 10% of other ethylenically mono-unsaturated compounds copolymerizable therewith, said graft copolymer (B) being selected from the group consisting of graft copolymers of from 10% to 80% of styrene upon homopolymers of butadiene and upon copolymers of butadiene containing at least 60% of butadiene together with up to 40% of styrene, up to 40% of alpha-methyl styrene and up to 10% of other ethylenically unsaturated compounds copolymerizable therewith, the maximum percentage of non-conjugated di-unsaturated compounds included in said other ethylenically unsaturated compounds being 3%, and said graft copolymers (B) further being produced by polymerizing styrene in the presence of said homopolymers and copolymers of butadiene, and said butadiene elastomer (C) being selected from the group consisting of homopolymers of butadiene and copolymers of butadiene containing at least 60% of butadiene and up to 40% of styrene, up to 40% of alphamethyl styrene, and up to 10% of other ethylenically unsaturated compounds copolymerizable therewith, the maximum amount of non-conjugated di-unsaturated compounds included in said other ethylenically unsaturated compounds being 3%, all of the above percentages of monomers being on the basis of the weights of the copolymers and graft copolymers in which they are contained.

14. A sheet suitable for hot post-forming comprising by weight:

| | Per cent |
|---|---|
| Polystyrene | 75 |
| A graft copolymer of 40%, by weight of the graft copolymer, of styrene upon polybutadiene, produced by polymerizing styrene in the presence of polybutadiene and | 10 |
| A copolymer of 90% butadiene with 10% styrene by weight | 15 |

15. A heat resistant injection molding comprising by weight:

| | Per cent |
|---|---|
| A copolymer of 70% styrene with 30% alpha-methyl styrene | 85 |
| A graft copolymer of 40% of styrene upon 60% of polybutadiene by weight, produced by polymerizing styrene in the presence of polybutadiene and | 5 |
| A copolymer of 90% butadiene, 10% styrene | 10 |

16. An injection molding comprising by weight:

| | Per cent |
|---|---|
| (A) A copolymer of 70% styrene with 30% alpha-methyl styrene | 95 |
| (B) A graft copolymer of 40% of styrene upon 60% of polybutadiene by weight, produced by polymerizing styrene in the presence of polybutadiene and | 1.5 |
| (C) A copolymer of 90% butadiene, 10% styrene | 3.5 |

References Cited in the file of this patent

UNITED STATES PATENTS

| 2,460,300 | Le Fevre et al. | Feb. 1, 1949 |
| 2,498,652 | Daly | Feb. 28, 1950 |
| 2,606,163 | Morris et al. | Aug. 5, 1952 |

UNITED STATES PATENT OFFICE
CERTIFICATE OF CORRECTION

Patent No. 2,755,270                                  July 17, 1956

Robert A. Hayes

It is hereby certified that error appears in the printed specification of the above numbered patent requiring correction and that the said Letters Patent should read as corrected below.

Column 2, line 22, for "polymer of" read -- polymer or --; column 4, line 44, for "be same" read -- be the same --; column 5, line 37, for "weight as" read -- weight (as --; column 8, line 1, for "composition" read -- compositions --; columns 7 and 8, Table I, ninth column thereof, next to the last line, for "21,000" read -- 21,600 --; column 13, line 22, for "exploded" read -- explored --; columns 13 and 14, Table VIII, fourth column thereof, first item under the right-hand sub heading, "Weight Ratio A/B/C", for "17.5/17.565" read -- 17.5/17.5/65 --; same table VIII, seventh column thereof, for the heading "Heat Distortion Temp. °C.)" read -- Heat Distortion Temp. (°C.) --.

Signed and sealed this 4th day of March 1958.

(SEAL)
Attest:

KARL H. AXLINE
Attesting Officer

ROBERT C. WATSON
                                                              Commissioner of Patents